United States Patent
Shen et al.

(10) Patent No.: US 10,852,927 B2
(45) Date of Patent: Dec. 1, 2020

(54) BROWSER FUNCTION BAR DISPLAY METHOD, APPARATUS, AND PROCESSING DEVICE

(71) Applicant: GUANGZHOU UCWEB COMPUTER TECHNOLOGY CO., LTD., Guangzhou (CN)

(72) Inventors: Meng Shen, Guangzhou (CN); Can Zeng, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 94 days.

(21) Appl. No.: 15/969,975

(22) Filed: May 3, 2018

(65) Prior Publication Data
US 2018/0253223 A1    Sep. 6, 2018

Related U.S. Application Data

(63) Continuation of application No. PCT/CN2016/102949, filed on Oct. 21, 2016.

(30) Foreign Application Priority Data

Nov. 6, 2015   (CN) .......................... 2015 1 0756513

(51) Int. Cl.
*G06F 3/0484*   (2013.01)
*G06F 3/0485*   (2013.01)
(Continued)

(52) U.S. Cl.
CPC ........ *G06F 3/04847* (2013.01); *G06F 3/0482* (2013.01); *G06F 3/0485* (2013.01); *G06F 3/04817* (2013.01)

(58) Field of Classification Search
CPC .. G06F 3/0482; G06F 3/0485; G06F 3/04817; G06F 3/0481
See application file for complete search history.

(56) References Cited

U.S. PATENT DOCUMENTS 5,530,455 A * 6/1996 Gillick ................. G06F 3/0312
345/156
6,526,424 B2   2/2003 Kanno et al.
(Continued)

FOREIGN PATENT DOCUMENTS

CN   101807193 A   8/2010
CN   102467566 A   5/2012
(Continued)

OTHER PUBLICATIONS

M. Brinkmann, "Create password protected private-browsing bookmarks in Firefox," published Apr. 7, 2015, downloaded from https://www.ghacks.net/2015/04/07/create-password-protected-private-browsing-bookmarks-in-firefox/ (Year: 2015).*
(Continued)

*Primary Examiner* — Eric J Yoon
(74) *Attorney, Agent, or Firm* — Sheppard Mullin Richter & Hampton LLP (57) ABSTRACT

A browser function bar display method, apparatus, and processing device. The method comprises: acquiring an operation on a function bar of a browser, the function bar being divided into a first function bar and a second function bar that independently store contents, wherein the second function bar is configured to store private content; when the operation meets preset requirements, switching the display of the first function bar and the second function bar. The method can improve the privacy of stored contents and better protect browsing privacy for a user.

19 Claims, 5 Drawing Sheets

(51) Int. Cl.
*G06F 3/0482* (2013.01)
*G06F 3/0481* (2013.01)

(56) References Cited

U.S. PATENT DOCUMENTS

| | | | |
|---|---|---|---|
| 7,051,117 B2 | 5/2006 | McGee et al. | |
| 7,324,997 B2 | 1/2008 | Yamada | |
| 7,469,381 B2 * | 12/2008 | Ording | G06F 3/0485 |
| | | | 715/702 |
| 7,873,748 B2 | 1/2011 | Cabezas et al. | |
| 8,433,995 B1 | 4/2013 | Karam | |
| 8,464,350 B2 | 6/2013 | Kanevsky et al. | |
| 8,789,198 B2 | 7/2014 | Phillips et al. | |
| 9,177,071 B2 | 11/2015 | Amrhein et al. | |
| 9,436,822 B2 | 9/2016 | Ghosh et al. | |
| 2003/0009521 A1 | 1/2003 | Cragun | |
| 2008/0059632 A1 | 3/2008 | Bocking et al. | |
| 2008/0250023 A1 | 10/2008 | Baker et al. | |
| 2008/0301222 A1 | 12/2008 | Schneider | |
| 2009/0007009 A1 * | 1/2009 | Luneau | G06F 3/0482 |
| | | | 715/808 |
| 2009/0249244 A1 | 10/2009 | Robinson et al. | |
| 2010/0138731 A1 | 6/2010 | Cantegrel | |
| 2011/0126105 A1 | 5/2011 | Isozu | |
| 2012/0311491 A1 * | 12/2012 | Melton | G06F 3/0482 |
| | | | 715/804 |
| 2013/0110869 A1 * | 5/2013 | Weber | G06F 16/9562 |
| | | | 707/770 |
| 2014/0282256 A1 * | 9/2014 | Fish | G06F 3/04886 |
| | | | 715/835 |
| 2014/0292725 A1 * | 10/2014 | Jung | G06F 3/0416 |
| | | | 345/178 |

FOREIGN PATENT DOCUMENTS

| | | |
|---|---|---|
| CN | 103412939 A | 11/2013 |
| CN | 103970544 A | 8/2014 |

OTHER PUBLICATIONS

GHacks Tech News, M. Brinkmann, "Switch Between Multiple Bookmark Bars in Google Chrome," published Mar. 4, 2012, downloaded from https://www.ghacks.net/2012/03/04/switch-between-multiple-bookmark-bars-in-google-chrome/ (Year: 2012).*

"How to Show Only Icons on Google Chrome bookmar bar," dotTech website, published Apr. 4, 2014, available at https://dottech.org/155407/how-to-show-only-icons-on-google-chrome-bookmark-bar-tip/ (Year: 2014).*

P. McFedries, The Complete Idiot's Guide to Google Chrome and Chrome OS, published Aug. 2010, selected excerpts (Year: 2010).*

A. Henry, "Hush Adds Private, Encrypted Bookmarks to Chrome's Incognito Mode," published Jul. 16, 2013, downloaded from https://lifehacker.com/hush-adds-private-encrypted-bookmarks-to-chromes-inco-792592473 (Year: 2013).*

International Search Report and Written Opinion for Application No. PCT/CN2016/102949, dated Jan. 25, 2017, 10 pages.

PCT International Preliminary Report on Patentability dated May 17, 2018, issued in related International Application No. PCT/CN2016/102949 (13 pages).

First Search dated Jun. 26, 2018, issued in related Chinese Application No. 201510756513.X (1 page).

First Office Action dated Jul. 4, 2018, issued in related Chinese Application No. 201510756513.X, with English machine translation (13 pages).

* cited by examiner

BROWSER FUNCTION BAR DISPLAY METHOD, APPARATUS, AND PROCESSING DEVICE

CROSS-REFERENCE TO RELATED APPLICATIONS

The present application is a continuation of International Application No. PCT/CN2016/102949, filed on Oct. 21, 2016, which is based on and claims priority to and benefits of Chinese Patent Application No. 201510756513.X, filed with the State Intellectual Property Office (SIPO) of the People's Republic of China on Nov. 6, 2015. The entire content of the above-identified applications is incorporated herein by reference.

TECHNICAL FIELD

The present disclosure relates to the field of mobile Internet technologies, and in particular, to a browser function bar display method, apparatus, and processing device.

BACKGROUND

People usually browse webpages through a browser (e.g., a mobile terminal browser or a PC browser). On a browser interface, some function bars would be typically provided at set positions, such as positions at the top of the browser interface, to facilitate a user to perform various operations. For example, a bookmark bar in a function bar is a general setup that all PC browsers possess. The bookmark bar can record bookmark information saved by a user.

Along with the development of browser technologies, an incognito private window ("incognito window" for short) has been developed, which is a special browsing window of a browser. When a user uses an incognito window to browse webpages, the browser does not record the browsing history, cookies, and other information of the user, thereby protecting the browsing privacy of the user.

A user may sometimes also save bookmarks for some websites in an incognito window, but existing browsers save these bookmarks in a conventional bookmark bar. Therefore, these bookmarks saved in an incognito window do not have good privacy. In the end, the browsing privacy of a user is not protected very well.

SUMMARY

To solve the above technical problem, the present disclosure provides a browser function bar display method, apparatus, and device, which can improve the privacy of saved contents and better protect the browsing privacy of a user.

According to one aspect of the present disclosure, a browser function bar display method is provided. The method comprises:

acquiring an operation on a function bar of a browser, the function bar being divided into a first function bar and a second function bar that independently store contents, wherein the second function bar is configured to store private content;

switching, when the operation is a preset operation, the display of the first function bar and the second function bar.

In some embodiments, the function bar is a bookmark bar, the first function bar is a conventional bookmark bar for storing conventional bookmarks in a non-incognito window, and the second function bar is a hidden bookmark bar for storing private hidden bookmarks in an incognito window.

The hidden bookmark bar may store a hidden bookmark added by the user when the browsing window is an incognito window and after a click on a menu option to add a bookmark or on a bookmark addition button in the address bar is acquired.

The switching the display of the first function bar and the second function bar may comprise:

switching the display of a conventional bookmark in the conventional bookmark bar and a hidden bookmark in the hidden bookmark bar.

In some embodiments, the preset operation is an operation to scroll a mouse, to swipe a gesture, or to click on a set icon in the function bar.

In some embodiments, the preset operation is an operation to scroll a mouse, to swipe a gesture, or to click on a set icon at a set position in the function bar.

In some embodiments, the switching, when the operation is a preset operation, the display of the first function bar and the second function bar comprises:

when the operation is an operation to scroll a mouse down or up, to swipe a gesture down or up, or to click on a switching icon in the first function bar, hiding the first function bar, and displaying the second function bar; alternatively, when the operation is an operation to scroll a mouse up or down, to swipe a gesture up or down, or to click on a switching icon in the second function bar, hiding the second function bar, and displaying the first function bar.

When a mouse is scrolled, a mouse scrolling message sent by the operating system is acquired, the mouse scrolling message comprises mouse scrolling direction information and current mouse position information, and the mouse scrolling direction and the position of the mouse in the first function bar or the second function bar are determined according to the mouse scrolling message.

The display may fly in along the mouse scrolling direction or gesture swiping direction, or fly in against the mouse scrolling direction or gesture swiping direction.

The switching the display of the first function bar and the second function bar may comprise:

switching the display of the first function bar and the second function bar according to a value of a sliding animation parameter sent by the operating system, wherein the value of the sliding animation parameter being 0 indicates hiding, the value being 1 indicates displaying all, and the value being between 0 and 1 indicates a partial display at a ratio of the value to the height of the function bar.

According to another aspect of the present disclosure, a browser function bar display apparatus is provided. The method comprises:

an acquiring module configured to acquire an operation on a function bar of a browser, the function bar being divided into a first function bar and a second function bar that independently store contents, wherein the second function bar is configured to store private content;

a switching module configured to switch, when the operation is a preset operation, the display of the first function bar and the second function bar.

In some embodiments, the apparatus may further comprise:

a storing module configured to store contents of the first function bar and the second function bar, respectively, wherein, when the function bar is a bookmark bar, the first function bar is a conventional bookmark bar for storing conventional bookmarks in a non-incognito window, and the second function bar is a hidden bookmark bar for storing private hidden bookmarks in an incognito window.

In some other embodiments, the apparatus may further comprise:

a creating module configured to create a hidden bookmark bar for storing a hidden bookmark added by the user when the browsing window is an incognito window and after a click on a menu option to add a bookmark or on a bookmark addition button in the address bar is acquired.

The process that the switching module switches the display of the first function bar and the second function bar may comprise:

switching the display of a conventional bookmark in the conventional bookmark bar and a hidden bookmark in the hidden bookmark bar.

In some embodiments, the preset operation comprises an operation to scroll a mouse, to swipe a gesture, or to click on a set icon in the function bar, and the switching module comprises:

a first switching module configured to switch the display of the first function bar and the second function bar when the operation is an operation to scroll a mouse in the function bar;

a second switching module configured to switch the display of the first function bar and the second function bar when the operation is an operation to swipe a gesture in the function bar;

a third switching module configured to switch the display of the first function bar and the second function bar when the operation is an operation to click on a set icon in the function bar.

In some embodiments, the preset operation is an operation to scroll a mouse, to swipe a gesture, or to click on a set icon at a set position in the function bar. The first switching module is configured to hide the first function bar and display the second function bar when the operation is scrolling a mouse down or up in the first function bar; alternatively, hide the second function bar and display the first function bar when the operation is scrolling a mouse up or down in the second function bar; alternatively, the second switching module is configured to hide the first function bar and display the second function bar when the operation is swiping a gesture down or up in the first function bar; alternatively, hide the second function bar and display the first function bar when the operation is swiping a gesture up or down in the second function bar; alternatively, the third switching module is configured to hide the first function bar and display the second function bar when the operation is clicking on a switching icon in the first function bar; alternatively, hide the second function bar and display the first function bar when the operation is clicking on a switching icon in the second function bar.

In some embodiments, the first switching module acquires, when a mouse is scrolled, a mouse scrolling message sent by the operating system, the mouse scrolling message comprises mouse scrolling direction information and current mouse position information, and the mouse scrolling direction and the position of the mouse in the first function bar or the second function bar are determined according to the mouse scrolling message.

In some embodiments, when the first switching module or the second switching module switches the display, the display flies in along the mouse scrolling direction or gesture swiping direction, or flies in against the mouse scrolling direction or gesture swiping direction.

According to another aspect of the present disclosure, a processing device is provided. The device comprises: a memory, a processor, and a browser function bar display apparatus stored in the memory and executed by the processor. The apparatus comprises: an acquiring module configured to acquire an operation on a function bar of a browser, the function bar being divided into a first function bar and a second function bar that independently store contents, wherein the second function bar is configured to store private content, and a switching module configured to switch, when the operation acquired by the acquiring module meets preset requirements, the display of the first function bar and the second function bar.

According to the technical solutions of embodiments of the present disclosure, the function bar is divided into a first function bar and a second function bar that independently store contents, and the second function bar is configured to store private content. Different contents, such as non-private contents and private contents, can be stored separately. After an operation on a function bar of a browser is acquired, the display of the first function bar and the second function bar is switched if it is determined that the operation meets preset requirements. Therefore, the privacy of stored contents can be improved, and the browsing privacy of a user can be better protected.

BRIEF DESCRIPTION OF THE DRAWINGS

The above and other objectives, features and advantages of the present disclosure will become more obvious through a more detailed description of exemplary implementation manners of the present disclosure with reference to the accompanying drawings, wherein identical reference numerals in the exemplary implementation manners of the present disclosure usually represent identical parts.

DETAILED DESCRIPTION

Preferred implementation manners of the present disclosure will be described in greater detail below with reference to the accompanying drawings. Although the accompanying drawings illustrate the preferred implementation manners of the present disclosure, it should be understood that the present disclosure may be implemented in various forms and shall not be limited by the implementation manners described herein. On the contrary, the implementation manners are provided for making the present disclosure more thorough and complete, and causing the scope of the present disclosure to be completely conveyed to a person skilled in the art.

The present disclosure provides a browser function bar display method, which can improve the privacy of stored contents and better protect browsing privacy for a user.

Considering the need of a user for privacy, the present disclosure proposes a function of hidden bookmarks and provides a hidden bookmark bar for separately saving bookmarks with high privacy requirements. Therefore, the hidden bookmark bar is independent and separated from a conventional bookmark bar, and their respectively stored bookmark data do not affect each other. With the hidden bookmark bar, the present disclosure can help a user record some private websites in an incognito window. The present disclosure further rapidly switches between a conventional bookmark in the conventional bookmark bar and a hidden bookmark in the hidden bookmark bar in a set manner, for example, achieving a rapid switch by scrolling of a mouse wheel when a mouse is used, which is convenient and rapid. In addition, when a touch screen is used, a rapid switch can also be achieved by swiping with touching gestures. Alternatively, the switch can be achieved by clicking on a set icon, such as a switching icon. It should be further noted that the solutions according to the present disclosure only display a conventional bookmark bar in a normal browsing window (i.e., a non-incognito window), and does not display a hidden bookmark bar. The hidden bookmark bar is displayed only when a user enters the incognito window, thereby ensuring that the user can only see the stored hidden bookmarks in the incognito window, which can improve the privacy of the bookmarks and better protect the browsing privacy for the user.

The solutions according to the present disclosure will be described below with reference to the accompanying drawings.

Figure 1:
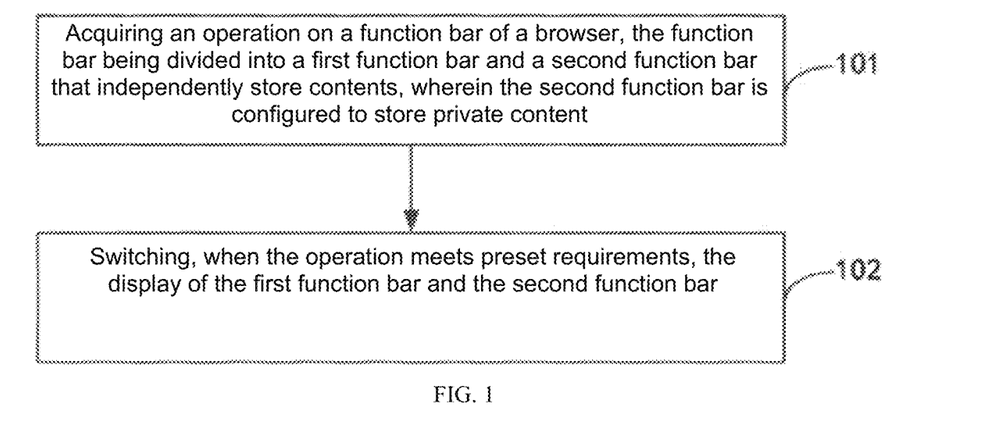
FIG. 1 is a schematic flow chart of a browser function bar display method according to an embodiment of the present disclosure.

FIG. 1 is a schematic flow chart of a browser function bar display method according to an embodiment of the present disclosure.

As shown in FIG. 1, the method comprises:

Step 101. Acquiring an operation on a function bar of a browser, the function bar being divided into a first function bar and a second function bar that independently store contents, wherein the second function bar is configured to store private content.

Here, the function bar can be a bookmark bar, the first function bar can be a conventional bookmark bar for storing conventional bookmarks in a non-incognito window, and the second function bar can be a hidden bookmark bar for storing private hidden bookmarks in an incognito window.

It should be noted that a bookmark bar is used above as an example of the function bar. However, the function bar is not limited thereby and may be other function bars of a browser interface.

Here, the hidden bookmark bar stores a hidden bookmark added by the user when the browsing window is an incognito window and after a click on a menu option to add a bookmark or on a bookmark addition button in the address bar is acquired.

Step 102. Switching, when the operation is a preset operation, the display of the first function bar and the second function bar.

When the function bar is a bookmark bar, this step switches the display of a conventional bookmark in the conventional bookmark bar and a hidden bookmark in the hidden bookmark bar when the operation is a preset operation. The preset operation may comprise an operation to scroll a mouse, to swipe a gesture, or to click on a set icon in the function bar. In some embodiments:

when the operation is an operation to scroll a mouse down or up, to swipe a gesture down or up, or to click on a switching icon in the first function bar, hiding the first function bar, and displaying the second function bar; alternatively, when the operation is an operation to scroll a mouse up or down, to swipe a gesture up or down, or to click on a switching icon in the second function bar, hiding the second function bar, and displaying the first function bar.

It can be seen that, according to the technical solution of the embodiment of the present disclosure, the function bar is divided into a first function bar and a second function bar that independently store contents, and the second function bar is configured to store private content. Then, different contents (e.g., non-private contents and private contents) can be stored separately. After an operation on a function bar of a browser is acquired, the display of the first function bar and the second function bar is switched if it is determined that the operation meets preset requirements. Therefore, the privacy of stored contents can be improved, and the browsing privacy of a user can be better protected.

The technical solutions according to the present disclosure will be further described in greater detail below.

Figure 2:
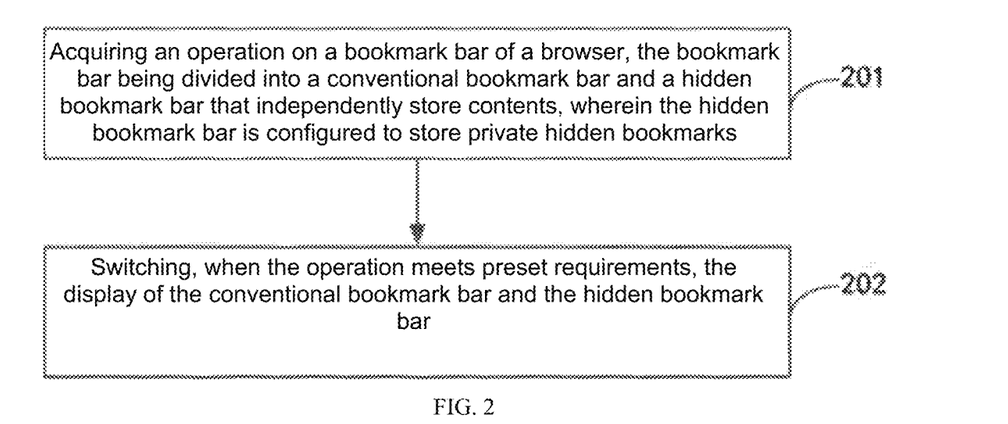
FIG. 2 is another schematic flow chart of a browser function bar display method according to an embodiment of the present disclosure.

FIG. 2 is another schematic flow chart of a browser function bar display method according to an embodiment of the present disclosure.

As shown in FIG. 2, the method comprises:

Step 201. Acquiring an operation on a bookmark bar of a browser, the bookmark bar being divided into a conventional bookmark bar and a hidden bookmark bar that independently store contents, wherein the hidden bookmark bar is configured to store private hidden bookmarks. In some embodiments, the conventional bookmark bar stores conventional bookmarks in a non-incognito window, and the hidden bookmark bar stores private hidden bookmarks in an incognito window. In some embodiments, the hidden bookmark bar stores a hidden bookmark added by the user when the browsing window is an incognito window and after a click on a menu option to add a bookmark or on a bookmark addition button in the address bar is acquired.

Step 202. Switching, when the operation is a preset operation, the display of the conventional bookmark bar and the hidden bookmark bar.

This step switches the display of a conventional bookmark in the conventional bookmark bar and a hidden bookmark in the hidden bookmark bar when the operation is a preset operation. The preset operation may comprise an operation to scroll a mouse, to swipe a gesture, or to click on a set icon in the bookmark bar. Preferably, in the present embodiment:

when the operation is an operation to scroll a mouse down or up, to swipe a gesture down or up, or to click on a switching icon in the conventional bookmark bar, hiding the conventional bookmark bar, and displaying the hidden bookmark bar; alternatively, when the operation is an operation to scroll a mouse up or down, to swipe a gesture up or down, or to click on a switching icon in the hidden bookmark bar, hiding the hidden bookmark bar, and displaying the conventional bookmark bar.

It can be seen that, according to the technical solution of the embodiment of the present disclosure, the bookmark bar is divided into a conventional bookmark bar and a hidden bookmark bar that independently store contents. Then, the conventional bookmark bar can store conventional bookmarks in a non-incognito window, and the hidden bookmark bar can store private hidden bookmarks in an incognito window. After an operation on a bookmark bar of a browser is acquired, the display of the conventional bookmark bar and the hidden bookmark bar is switched if it is determined that the operation meets preset requirements. Therefore, the privacy of stored bookmarks can be improved, and the browsing privacy of a user can be better protected.

Figure 3:
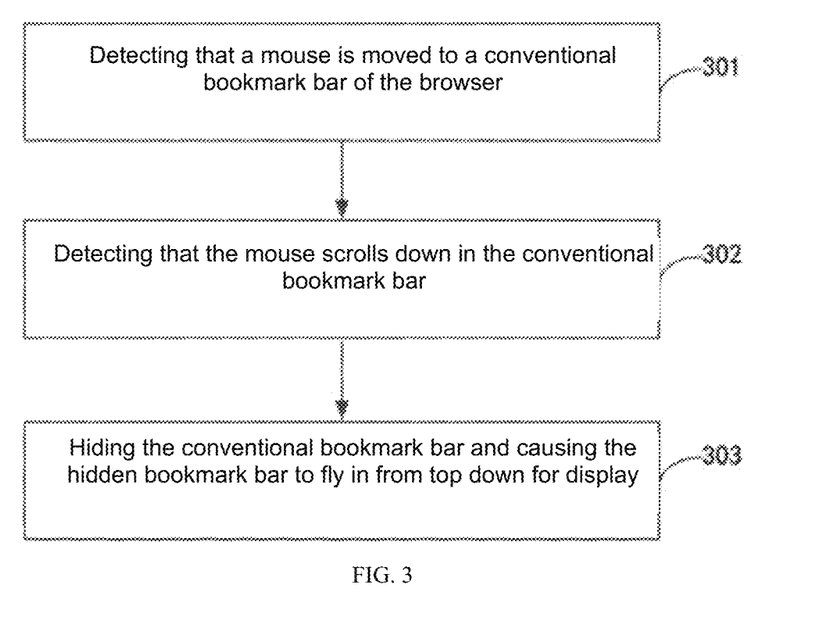
FIG. 3 is a schematic flow chart of a method for switching a conventional bookmark to a hidden bookmark according to an embodiment of the present disclosure.

FIG. 3 is a schematic flow chart of a method for switching a conventional bookmark to a hidden bookmark according to an embodiment of the present disclosure. The embodiment uses an example in which the browser is a PC browser; however, the embodiment is not limited thereby.

As shown in FIG. 3, the method comprises:

Step 301. Detecting that a mouse is moved to a conventional bookmark bar of the browser.

Step 302. Detecting that the mouse scrolls down in the conventional bookmark bar.

In the present disclosure, the middle mouse button scrolling down or up is a signal to start switching bookmarks. When the mouse is scrolled, the Windows operating system sends a mouse scrolling message (the WM_MOUSE-WHEEL message) to the browser, and the BookmarkbarView class receives the mouse scrolling message, which comprises instruction information of the mouse wheel scrolling down or up, and the current position of the mouse.

According to the information comprised in the mouse scrolling message, this step can determine the mouse scrolling direction and the position of the mouse in the bookmark bar. Therefore, it can be detected in this step that the mouse scrolls down in the conventional bookmark bar.

Figure 7:
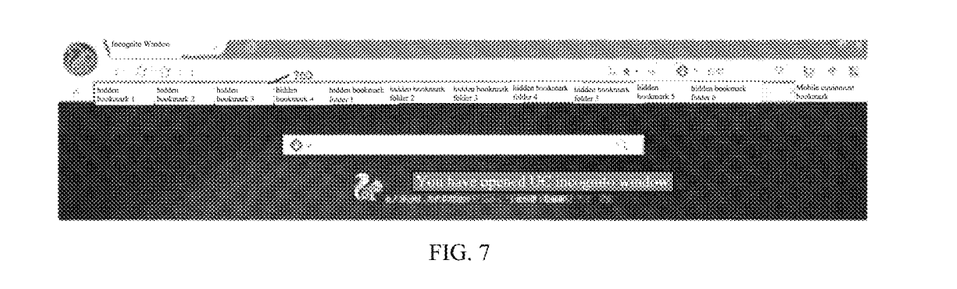
FIG. 7 is a schematic diagram of a valid position of a mouse during scrolling according to an embodiment of the present disclosure.

It should be noted that it can be further set up in some embodiments of the present disclosure that switching is triggered only when a mouse is scrolled at a set position of a bookmark bar. Therefore, the step can further detect whether the mouse is moved to a bookmark position in the conventional bookmark bar. In other words, switching of bookmarks is triggered when a user scrolls a mouse at a valid position of a bookmark bar. The set position may be set at a position of the bookmark bar that displays a bookmark. Since the bookmark bar also has other buttons, such as a button to add bookmark, a button to import bookmarks, a button of more bookmarks, a button of cell phone bookmark, etc., it can be set up in such a way that bookmarks will not be switched when a mouse scrolls over these buttons, while the normal switch between the conventional bookmark bar and the hidden bookmark bar is triggered when the mouse scrolls at the display position of bookmarks, so as to ensure better operating experience. FIG. 7 is a schematic diagram of a valid position of a mouse during scrolling according to an embodiment of the present disclosure, and the valid position of the bookmark bar that triggers switching is shown by the box position 700 in FIG. 7.

Step 303. Hiding the conventional bookmark bar and causing the hidden bookmark bar to fly in from top down for display.

When it is detected that the mouse scrolls down in the conventional bookmark bar, or it is detected that the mouse scrolls down at the bookmark position of the conventional bookmark bar, this step hides the conventional bookmark bar (i.e., the conventional bookmark bar disappears), and causes the hidden bookmark bar to fly in from top down for display.

In the present disclosure, the classes and methods in C++ program can be used to set up relevant elements and processes. For example, a bookmark bar is described by using the BookmarkBarview class, and each bookmark on the bookmark bar is a BookmarkButton object. Positions and layout structures of bookmarks on the bookmark bar are implemented by the Layout function of BookmarkBarView.

It should be noted that the above description is an example in which the conventional bookmark bar is hidden, and the hidden bookmark bar is displayed when the operation is scrolling a mouse down in the conventional bookmark bar. However, the present disclosure is not limited thereby. An opposite setup may be feasible. For example, when the mouse is scrolled up in the conventional bookmark bar, the conventional bookmark bar is hidden, and the hidden bookmark bar is displayed. In addition, the above description is an example in which the hidden bookmark bar flies in from top down for display. However, the present disclosure is not limited thereby. The hidden bookmark bar may also fly in from bottom up for display.

In this step, the present disclosure can display an animation of bookmark switching by calculating the position of a bookmark in the bookmark bar.

The present disclosure can invoke the SlideAnimation class to calculate the rule of a sliding animation parameter A varying from 0 to 1 within a certain time, which is used to represent the rule according to which the position of a bookmark varies on a bookmark bar. Here, SlideAnimation is a class (which can be simply understood as a function unit) for calculation of variation rules and in charge of calculating a general rule according to which the position of a bookmark varies on a bookmark bar. SlideAnimation can generate a sliding animation parameter A at a fixed time interval, the value of A varies between 0 and 1 (including 0 and 1), and the variation of the value of A is directly related to the position scrolling of a bookmark. With the value of A and with reference to the overall height of a bookmark bar, the current position of the bookmark on the bookmark bar can be calculated, and a switching animation can be shown according to the position of the bookmark on the bookmark bar.

For example, when the sliding animation parameter A is 0, it indicates that the bookmark is hidden on the bookmark bar; when A is 1, it indicates that the bookmark is fully displayed on the bookmark bar; and when A is between 0 and 1, it indicates that the bookmark is partially displayed on the bookmark bar, and more will be displayed along with the increased A value.

The display of a hidden bookmark on the bookmark bar is used as an example. The overall height of the hidden bookmarks is H, and the position of the bottom coordinate of one hidden bookmark is Y. When A is 0, Y is 0, and the hidden bookmark is invisible on the bookmark bar. When $A=0.5$, Y is $H*0.5$, and one half of the hidden bookmark is displayed on the bookmark bar. When $A=1$, $Y=H$, and the hidden bookmark is fully displayed on the bookmark bar. As SlideAnimation can continuously invoke back-end programs to calculate different bookmark positions, the display through such a series of calculations and variations leads to a visual effect that the bookmark falls down from the top of the bookmark bar or rises up from the bottom of the bookmark bar, which forms a switching animation to achieve the fly-in effect for the bookmark bar.

Figure 4:
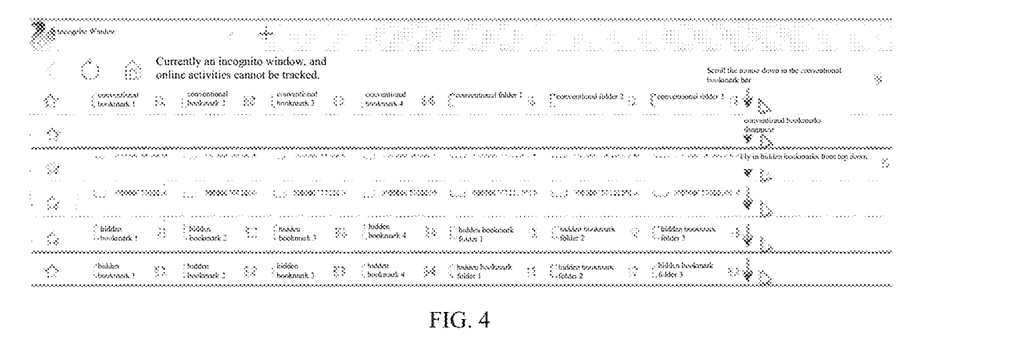
FIG. 4 is a schematic diagram that illustrates a process of switching a conventional bookmark to a hidden bookmark according to an embodiment of the present disclosure.

FIG. 4 can be referred to for an illustration of the processing described in FIG. 3 above. FIG. 4 is a schematic diagram that illustrates a process of switching a conventional bookmark to a hidden bookmark according to an embodiment of the present disclosure. As shown in FIG. 4, the mouse is moved to the conventional bookmark bar and then scrolled down, the conventional bookmark disappears, and the hidden bookmark flies in from top down.

It should be further noted that the above embodiment uses a scrolling mouse as an example for description. However, the present disclosure is not limited thereby. Other manners may be adopted in other circumstances, and the principle thereof will be the same. A mouse scrolling operation is generally used in PC browsers. If a PAD browser or other terminal browsers are used, the screen is generally touchable. Then, the switch between a conventional bookmark and a hidden bookmark can be achieved rapidly by swiping of touch gestures. Alternatively, a set icon, such as switching icon, can be set up in the bookmark bar for either a PC browser or other browsers, and the switch between a conventional bookmark and a hidden bookmark can be achieved by clicking on the set icon.

For example:

when the operation is swiping a gesture or clicking on the set icon in the bookmark bar, the conventional bookmark and the hidden bookmark are switched for display.

when the operation is swiping a gesture down or up or clicking on the switching icon in the conventional bookmark bar, the conventional bookmark bar is hidden, and the hidden bookmark bar is displayed.

when the display is switched, the hidden bookmark bar flies in along the gesture swiping direction or against the gesture swiping direction.

Figure 5:
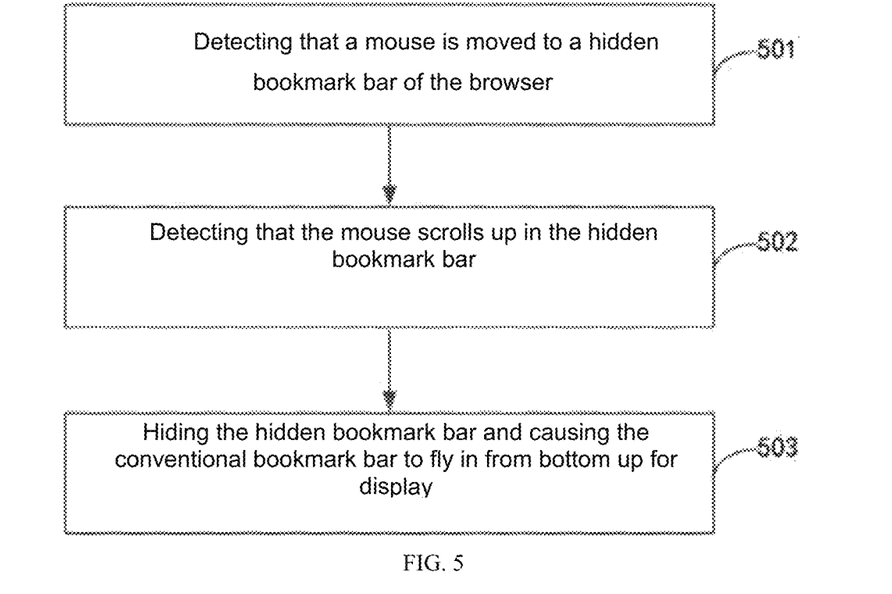
FIG. 5 is a schematic flow chart of a method for switching a hidden bookmark to a conventional bookmark according to an embodiment of the present disclosure.

FIG. 5 is a schematic flow chart of a method for switching a hidden bookmark to a conventional bookmark according to an embodiment of the present disclosure.

As shown in FIG. 5, the method comprises:

Step 501. Detecting that a mouse is moved to a hidden bookmark bar of the browser.

The hidden bookmark bar according to the present disclosure can store private hidden bookmarks that require high privacy in an incognito window.

If the user needs to add a hidden bookmark, the browser can pop up a dialog box for adding bookmarks when the bookmark addition button is clicked on. A folder of hidden bookmarks is shown in the dialog box, and the user can choose to save the bookmark to the hidden bookmarks and complete the bookmark adding operation.

Figure 8:
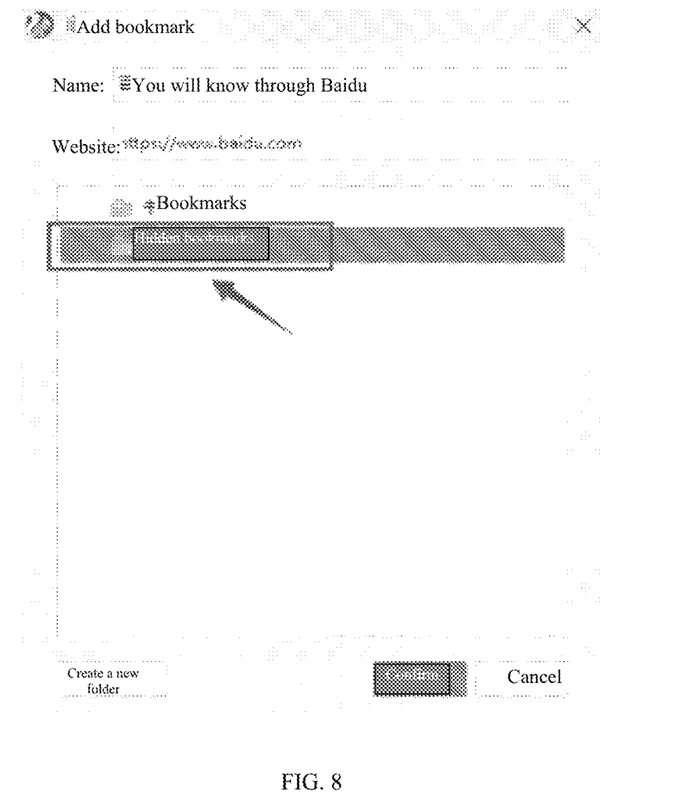
FIG. 8 is a schematic diagram of adding a hidden bookmark according to an embodiment of the present disclosure.

The browser according to the present disclosure can provide two common portals for users to add bookmarks. For example, when it is detected that an address bar favorite button is clicked on, or when it is detected that the right mouse button is clicked and "Add to bookmark" is selected from the appearing menu, a prompt box to add bookmark is popped up for the user, as shown in FIG. 8. FIG. 8 is a schematic diagram of adding a hidden bookmark according to an embodiment of the present disclosure, and a user can choose to save a bookmark to conventional bookmarks or hidden bookmarks.

It should be noted that the present disclosure displays a tree node of hidden bookmarks in a bookmark editing dialog box for a user to operate, when the user selects an incognito window in the browsing mode and clicks on a menu option to add a bookmark or on a bookmark addition button in the address bar.

For addition of a hidden bookmark, the present disclosure uses some classes for settings and invocation. For example:

the BookmarkEditorView class is used to implement the display of all UIs (User Interfaces) of the bookmark editing dialog box and various operations on bookmarks (add, delete, edit, rename, and the like);

the RenderViewContextMenu class is used to process all clicking behaviors on a page menu;

the BookmarkStarMenuModel class is used to process clicking behaviors on a bookmark addition button in the address bar;

the BookmarkBarMenuModel class is used to process clicking behaviors on a right button menu on the bookmark bar.

When a menu option to add a bookmark is clicked in the above three classes, the respective ExecuteCommand method thereof will be invoked to process the clicking behavior, wherein a Show method in the BookmarkEditor class will always be invoked inside the ExecuteCommand method to display the bookmark editing dialog box.

Here, BookmarkEditorView uses the CreateNodes method to create folder nodes for all bookmarks in the tree structure of the dialog box. In a non-incognito window, the CreateNodes method can actively omit tree nodes of the hidden bookmark folder to achieve the goal of hiding bookmarks.

Step 502. Detecting that the mouse scrolls up in the hidden bookmark bar.

The present disclosure can further set up that switching is triggered only when a mouse is scrolled at a set position of a bookmark bar. Therefore, this step can further detect whether the mouse is moved to a bookmark position in the hidden bookmark bar. See the description in Step 302 for the set position.

When the mouse is scrolled, a mouse scrolling message can be generated. See the description in Step 302 for details, which will not be repeated herein. According to the information comprised in the mouse scrolling message, this step can determine the mouse scrolling direction and the position of the mouse in the bookmark bar. Therefore, it can be detected in this step that the mouse scrolls up in the hidden bookmark bar.

Step 503. Hiding the hidden bookmark bar and causing the conventional bookmark bar to fly in from bottom up for display.

When it is detected that the mouse scrolls up in the hidden bookmark bar, or it is detected that the mouse scrolls up at the bookmark position of the hidden bookmark bar, this step hides the hidden bookmark bar (i.e., the hidden bookmark bar disappears), and causes the conventional bookmark bar to fly in from bottom up for display.

In this step, relevant classes and methods can be invoked to implement a switching animation. See the description in Step 303 for details, where the principle is similar.

It should be noted that the above description is an example in which the hidden bookmark bar is hidden, and the conventional bookmark bar is displayed when the operation is scrolling a mouse up in the hidden bookmark bar. However, the present disclosure is not limited thereby. An opposite setup may be feasible. For example, when the mouse is scrolled down in the hidden bookmark bar, the hidden bookmark bar is hidden, and the conventional bookmark bar is displayed. In addition, the above description is an example in which the conventional bookmark bar flies in from bottom up for display. However, the present disclosure is not limited thereby. The conventional bookmark bar may also fly in from top down for display.

Figure 6:
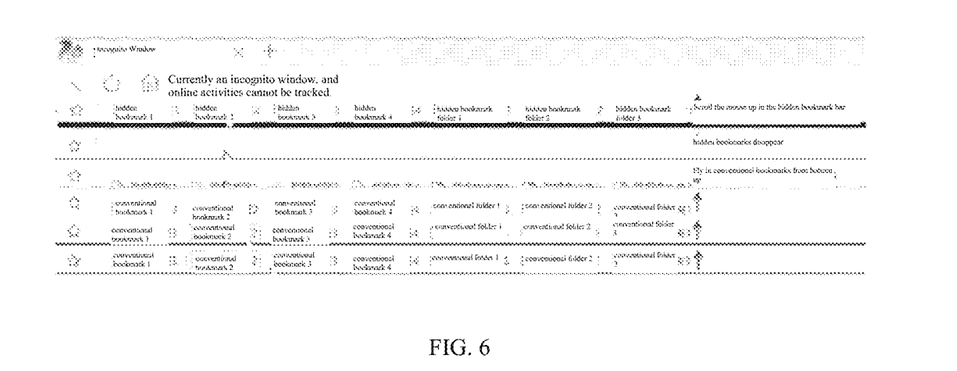
FIG. 6 is a schematic diagram that illustrates a process of switching a hidden bookmark to a conventional bookmark according to an embodiment of the present disclosure.

FIG. 6 can be referred to for an illustration of the processing described in FIG. 5 above. FIG. 6 is a schematic diagram that illustrates a process of switching a hidden bookmark to a conventional bookmark according to an embodiment of the present disclosure. As shown in FIG. 6, the mouse is moved to the hidden bookmark bar and then scrolled up, the hidden bookmark disappears, and the conventional bookmark flies in from bottom up.

It should be further noted that the above embodiment uses a scrolling mouse as an example for description. However, the present disclosure is not limited thereby. Other manners may be adopted in other circumstances, and the principle thereof will be the same.

For example:

when the operation is swiping a gesture or clicking on the set icon in the bookmark bar, the conventional bookmark and the hidden bookmark are switched for display.

when the operation is swiping a gesture up or down or clicking on the switching icon in the hidden bookmark bar, the hidden bookmark bar is hidden, and the conventional bookmark bar is displayed.

when the display is switched, the conventional bookmark bar flies in along the gesture swiping direction or against the gesture swiping direction.

In summary, it can be seen that the solutions of the present disclosure provide a function of hidden bookmark bar for an incognito window of a browser, and adopt a preset manner, such as an interactive design to dynamically switch between a conventional bookmark bar and a hidden bookmark bar through mouse scrolling. With the solutions of the present disclosure, a user can switch between a conventional bookmark bar and a hidden bookmark bar through scrolling operations of a mouse wheel in the bookmark bar, and does not need to perform complex operations. The operating cost is low, and the operations are simple and easy to use. With no need to perform complex clicking or searching operations, the user can rapidly switch between a conventional bookmark bar and a hidden bookmark bar by directly using the simplest wheel operations of a mouse. In addition, the present disclosure sets up dynamic fly-in and fly-out manners for the conventional bookmark bar and the hidden bookmark bar, which results in a strong visual effect for users, while the original conventional bookmark bar is fixed on a browser with no changes. Such dynamic fly-in and fly-out manners of the present disclosure can achieve a significant stimulating visual effect on users. Furthermore, the manner in which a hidden bookmark is added according to the present disclosure is similar to the manner in which a conventional bookmark is added, which is consistent with long-time operating habits of users and can be quickly grasped and used by the users.

The browser function bar display method according to the present disclosure is described in detail above. Correspondingly, the present disclosure further provides a browser function bar display apparatus.

Figure 9:
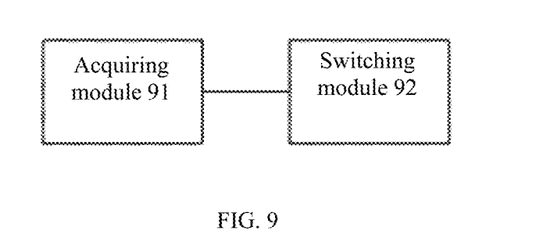
FIG. 9 is a schematic block diagram of a browser function bar display apparatus according to the present disclosure.

FIG. 9 is a schematic block diagram of a browser function bar display apparatus according to the present disclosure.

As shown in FIG. 9, the apparatus comprises: an acquiring module 91 and a switching module 92.

The acquiring module 91 is configured to acquire an operation on a function bar of a browser, the function bar being divided into a first function bar and a second function bar that independently store contents, wherein the second function bar is configured to store private content.

The function bar can be a bookmark bar, the first function bar can be a conventional bookmark bar for storing conventional bookmarks in a non-incognito window, and the second function bar can be a hidden bookmark bar for storing private hidden bookmarks in an incognito window. The hidden bookmark bar stores a hidden bookmark added by the user when the browsing window is an incognito window and after a click on a menu option to add a bookmark or on a bookmark addition button in the address bar is acquired.

It should be noted that a bookmark bar is used above as an example of the function bar. However, the function bar is not limited thereby and may be other function bars of a browser interface.

The switching module 92 is configured to switch, when the operation acquired by the acquiring module 91 is a preset operation, the display of the first function bar and the second function bar.

It can be seen that, according to the technical solutions of embodiments of the present disclosure, the function bar is divided into a first function bar and a second function bar that independently store contents, and the second function bar is configured to store private content. Then, different contents, such as non-private contents and private contents, can be stored separately. After an operation on a function bar of a browser is acquired, the display of the first function bar and the second function bar is switched if it is determined that the operation meets preset requirements. Therefore, the privacy of stored contents can be improved, and the browsing privacy of a user can be better protected.

Figure 10:
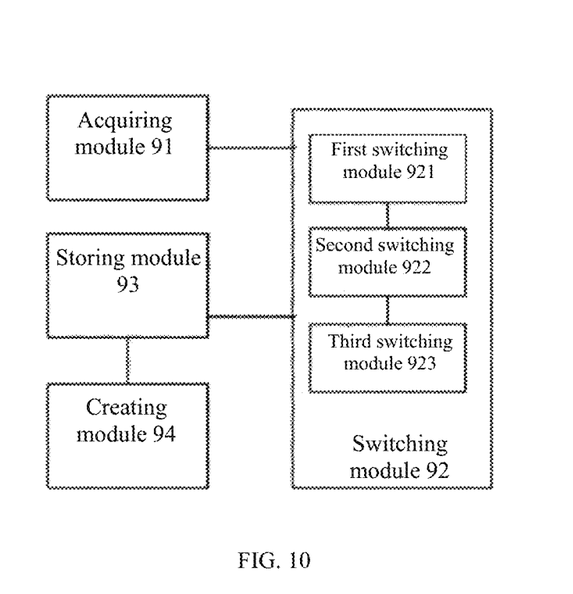
FIG. 10 is another schematic block diagram of a browser function bar display apparatus according to the present disclosure.

FIG. 10 is another schematic block diagram of a browser function bar display apparatus according to the present disclosure.

As shown in FIG. 10, the apparatus comprises: an acquiring module 91, a switching module 92, a storing module 93, and a creating module 94.

See the description in FIG. 9 for functions of the acquiring module 91 and the switching module 92, which will not be repeated herein.

The storing module 93 is configured to store contents of the first function bar and the second function bar, respectively, wherein, when the function bar is a bookmark bar, the first function bar is a conventional bookmark bar for storing conventional bookmarks in a non-incognito window, and the second function bar is a hidden bookmark bar for storing private hidden bookmarks in an incognito window.

The creating module 94 is configured to create a hidden bookmark bar for storing a hidden bookmark added by the user when the browsing window is an incognito window and after a click on a menu option to add a bookmark or on a bookmark addition button in the address bar is acquired.

Here, the switching module 92 switches, when the operation acquired by the acquiring module 91 is a preset operation, the display of a conventional bookmark in the conventional bookmark bar and a hidden bookmark in the hidden bookmark bar.

Furthermore, the preset operation comprises an operation to scroll a mouse, to swipe a gesture, or to click on a set icon in the function bar, and the switching module 92 comprises: a first switching module 921, a second switching module 922, and a third switching module 923.

The first switching module 921 is configured to switch the display of the first function bar and the second function bar when the operation is an operation to scroll a mouse in the function bar.

The second switching module 922 is configured to switch the display of the first function bar and the second function bar when the operation is an operation to swipe a gesture in the function bar.

The third switching module 923 is configured to switch the display of the first function bar and the second function bar when the operation is an operation to click on a set icon in the function bar.

Furthermore, the preset operation is an operation to scroll a mouse, to swipe a gesture, or to click on a set icon at a set position in the function bar. Furthermore, the first switching module 921 is configured to hide the first function bar and display the second function bar when the operation is scrolling a mouse down or up in the first function bar; alternatively, hide the second function bar and display the first function bar when the operation is scrolling a mouse up or down in the second function bar.

The first switching module 921 acquires, when a mouse is scrolled, a mouse scrolling message sent by the operating system, the mouse scrolling message comprises mouse scrolling direction information and current mouse position information, and the mouse scrolling direction and the position of the mouse in the first function bar or the second function bar are determined according to the mouse scrolling message.

The switching the display of the first function bar and the second function bar by the first switching module 921 comprises: switching the display of the first function bar and the second function bar according to a value of a sliding animation parameter sent by the operating system, wherein the value of the sliding animation parameter being $0$ indicates hiding, the value being 1 indicates displaying all, and the value being between 0 and 1 indicates a partial display at a ratio of the value to the height of the function bar.

The second switching module 922 is configured to hide the first function bar and display the second function bar when the operation is swiping a gesture down or up in the first function bar; alternatively, hide the second function bar and display the first function bar when the operation is swiping a gesture up or down in the second function bar.

The third switching module 923 is configured to hide the first function bar and display the second function bar when the operation is clicking on a switching icon in the first function bar; alternatively, hide the second function bar and display the first function bar when the operation is clicking on a switching icon in the second function bar.

When the first switching module 921 or the second switching module 922 switches the display, the display flies in along the mouse scrolling direction or gesture swiping direction, or flies in against the mouse scrolling direction or gesture swiping direction.

Furthermore, the preset operation provides a processing device.

Figure 11:
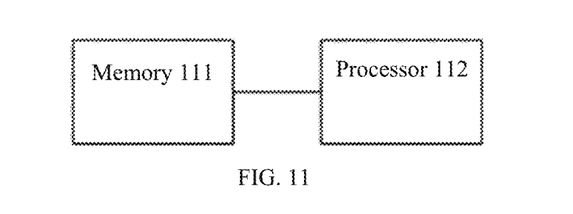
FIG. 11 is a schematic block diagram of a processing device according to the present disclosure.

FIG. 11 is a schematic block diagram of a processing device according to the present disclosure.

As shown in FIG. 11, the processing device comprises: a memory 111 and a processor 112. A browser function bar display apparatus 90 is stored in the memory and can be executed by the processor, the apparatus comprising the prompt window creating module 91 and the custom information display module 92.

The acquiring module 91 is configured to acquire an operation on a function bar of a browser, the function bar being divided into a first function bar and a second function bar that independently store contents, wherein the second function bar is configured to store private content.

The switching module 92 is configured to switch, when the operation acquired by the acquiring module is a preset operation, the display of the first function bar and the second function bar.

It should be noted that the description of the processes above can be referred to for details of other programs stored in the memory 111, which will not be repeated herein, and that the processor 112 is further configured to execute other programs stored in the memory 111.

The technical solutions according to the present disclosure have been described in detail above with reference to the accompanying drawings.

In addition, the method according to the present disclosure can be further implemented as a computer program. The computer program comprises computer program code instructions for executing the above steps defined in the above method according to the present disclosure. Alternatively, the method according to the present disclosure can be further implemented as a computer program product. The computer program product comprises a computer readable medium, and a computer program for executing the above functions defined in the above method according to the present disclosure is stored on the computer readable medium. A person skilled in the art can also understand that various exemplary logic blocks, modules, circuits, and algorithm steps described with reference to the disclosure herein can be implemented as electronic hardware, computer software, or a combination of the two.

The flow charts and block diagrams in the accompanying drawings illustrate system architectures, functions, and operations that may be implemented according to the systems and methods in the plurality of embodiments of the present disclosure. With respect to this point, each block in the flow charts or block diagrams can represent a module, a program segment or a part of codes, and the module, the program segment or the part of codes can comprise one or more executable instructions for implementing prescribed logic functions. It should also be noted that, in some alternative implementations, functions marked in the blocks can also take place in an order different from the one marked in the accompanying drawings. For example, two consecutive blocks can practically be executed substantially in parallel, and they can sometimes be executed in a reverse order, which depends on the involved functions. It should also be noted that each block in the block diagrams and/or the flow charts, as well as combinations of the blocks in the block diagrams and/or the flow charts, can be implemented by using a hardware-based dedicated system for executing prescribed functions or operations, or implemented by using a combination of dedicated hardware and computer instructions.

The embodiments of the present disclosure are described above. The description is illustrative, rather than exhaustive, and is not limited to the disclosed embodiments. Without departing from the scope and spirit of the described embodiments, many modifications and variations are obvious to a person skilled in the art. The selection of the terms used herein is intended to explain, in the most effective manner, the principles, practical applications, or improvements to the technologies on the market of the embodiments, or to enable a person skilled in the art to understand the embodiments disclosed herein.

The invention claimed is:

1. A browser function bar display method, comprising:
    acquiring an operation on a browser function bar of a browser window of a browser, wherein the browser function bar includes a first function bar, wherein the browser window is selected to be either an incognito window or a non-incognito window;
    in response to the browser window being the incognito window:
        creating a second function bar configured to store private content including one or more hidden website bookmarks wherein the second function bar and the hidden website bookmarks are not displayed at any point in time in which the browser window is the non-incognito window;

switching, when the operation is a preset operation, between a display of the first function bar and a display of the second function bar in the browser function bar, wherein the switching includes hiding one and revealing the other of the first function bar and the second function bar and wherein the first function bar, when revealed, displays one or more conventional website bookmarks added to the browser using the non-incognito window of the browser; and when the operation comprises adding a website bookmark, displaying a tree node of hidden bookmarks in a bookmark editing dialog box, wherein the bookmark editing dialog box provides an option for a user to select between saving the website bookmark to the conventional website bookmarks and saving the website bookmark to the hidden website bookmarks; and in response to the browser window being the non-incognito window:

displaying the first function bar while refraining from switching between the first function bar and the second function bar; and when the operation comprises adding a website bookmark, refraining from displaying the tree node of the hidden bookmarks in the bookmark editing dialog box.

2. The method according to claim 1, wherein:
the first function bar is a bookmark bar for storing website bookmarks in the non-incognito window, and the second function bar is a hidden bookmark bar for storing private hidden bookmarks in the incognito window.

3. The method according to claim 2, wherein
the hidden bookmark bar stores a hidden bookmark added by a user when the browser window is the incognito window and after acquiring a click on a menu option or a bookmark addition button to add the hidden bookmark, the bookmark addition button being in an address bar.

4. The method according to claim 2, wherein the switching between the display of the first function bar and the display of the second function bar comprises:
switching between a display of a bookmark in the bookmark bar and a display of a hidden bookmark in the hidden bookmark bar.

5. The method according to claim 4, wherein the switching between the display of the first function bar and the display of the second function bar comprises:
switching between the display of the first function bar and the display of the second function bar according to a value of a sliding animation parameter sent by an operating system, wherein the value of the sliding animation parameter being 0 indicates hiding, the value being 1 indicates displaying all, and the value being between 0 and 1 indicates a partial display at a ratio of the value to the height of the browser function bar.

6. The method according to claim 1, wherein the preset operation is an operation to scroll a mouse, to swipe, or to click on a set icon in the browser function bar.

7. The method according to claim 6, wherein the preset operation is an operation to scroll a mouse, to swipe, or to click on a set icon at a set position in the browser function bar.

8. The method according to claim 6, wherein the switching, when the operation is a preset operation, between the display of the first function bar and the display of the second function bar comprises:
when the operation is an operation to scroll a mouse in a first direction, to swipe in the first direction, or to click on a switching icon in the first function bar, hiding the first function bar, and displaying the second function bar; and when the operation is an operation to scroll a mouse in a second direction, to swipe in the second direction, or to click on a switching icon in the second function bar, hiding the second function bar, and displaying the first function bar.

9. The method according to claim 8, further comprising:
acquiring, when a mouse is scrolled, a mouse scrolling message sent by an operating system, wherein the mouse scrolling message comprises mouse scrolling direction information and current mouse position information, and the mouse scrolling direction information and the current mouse position information in the first function bar or the second function bar are determined according to the mouse scrolling message.

10. The method according to claim 6, wherein the display of the first function bar or the second function bar flies in along a mouse scrolling direction or swiping direction, or flies in against the mouse scrolling direction or swiping direction.

11. A browser function bar display apparatus comprising one or more processors and one or more non-transitory computer readable storage media storing instructions executable by the one or more processors to cause the one or more processors to perform operations comprising:
acquiring an operation on a browser function bar of a browser window of a browser, wherein the browser function bar includes a first function bar, wherein the browser window is selected to be either an incognito window or a non-incognito window;

in response to the browser window being the incognito window:

creating a second function bar configured to store private content including one or more hidden website bookmarks wherein the second function bar and the hidden website bookmarks are not displayed at any point in time in which the browser window is the non-incognito window;

switching, when the operation is a preset operation, between a display of the first function bar and a display of the second function bar in the browser function bar, wherein the switching includes hiding one and revealing the other of the first function bar and the second function bar and wherein the first function bar, when revealed, displays one or more conventional website bookmarks added to the browser using the non-incognito window of the browser; and when the operation comprises adding a website bookmark, displaying a tree node of hidden bookmarks in a bookmark editing dialog box, wherein the bookmark editing dialog box provides an option for a user to select between saving the website bookmark to the conventional website bookmarks and saving the website bookmark to the hidden website bookmarks; and in response to the browser window being the non-incognito window:

displaying the first function bar while refraining from switching between the first function bar and the second function bar; and when the operation comprises adding a website bookmark, refraining from displaying the tree node of the hidden bookmarks in the bookmark editing dialog box.

12. The apparatus according to claim 11, wherein:

the first function bar is a bookmark bar for storing website bookmarks in the non-incognito window, and the second function bar is a hidden bookmark bar for storing private hidden bookmarks in the incognito window.

13. The apparatus according to claim 12, wherein the hidden bookmark bar stores a hidden bookmark added by a user when the browser window is the incognito window and after acquiring a click on a menu option or a bookmark addition button to add the hidden bookmark, the bookmark addition button being in an address bar.

14. The apparatus according to claim 12, wherein the switching between the display of the first function bar and the display of the second function bar comprises:

switching between a display of a bookmark in the bookmark bar and a display of a hidden bookmark in the hidden bookmark bar.

15. The apparatus according to claim 11, wherein the preset operation comprises an operation to scroll a mouse, to swipe, or to click on a set icon in the browser function bar.

16. The apparatus according to claim 15, wherein the preset operation is an operation to scroll a mouse, to swipe, or to click on a set icon at a set position in the browser function bar.

17. The apparatus according to claim 15, wherein the switching, when the operation is a preset operation, between the display of the first function bar and the display of the second function bar comprises:

hiding the first function bar and displaying the second function bar when the operation is scrolling a mouse in a first direction in the first function bar, and hiding the second function bar and displaying the first function bar when the operation is scrolling a mouse in a second direction in the second function bar;

hiding the first function bar and displaying the second function bar when the operation is swiping in the first direction in the first function bar, and hiding the second function bar and displaying the first function bar when the operation is swiping in the second direction in the second function bar and, hiding the first function bar and displaying the second function bar when the operation is clicking on a switching icon in the first function bar, and hiding the second function bar and displaying the first function bar when the operation is clicking on a switching icon in the second function bar.

18. The apparatus according to claim 17, wherein the instructions further cause the one or more processors to perform:

acquiring, when a mouse is scrolled, a mouse scrolling message sent by an operating system, the mouse scrolling message comprising mouse scrolling direction information and current mouse position information, and the mouse scrolling direction and the position of the mouse in the first function bar or the second function bar are determined according to the mouse scrolling message.

19. The apparatus according to claim 15, wherein the display of the first function bar or the second function bar flies in along a mouse scrolling direction or swiping direction, or flies in against the mouse scrolling direction or swiping direction.

* * * * *